United States Patent
Fabry

[11] 3,845,479
[45] Oct. 29, 1974

[54] APPARATUS FOR TESTING ELECTRICALLY ACTUATED CLUTCHES

[75] Inventor: Donald F. Fabry, Garden City, Mich.

[73] Assignee: Burroughs Corporation, Detroit, Mich.

[22] Filed: Oct. 10, 1973

[21] Appl. No.: 405,166

[52] U.S. Cl. ......... 340/213 R, 340/271, 340/267 R, 192/12 R, 192/30 W, 73/136 R
[51] Int. Cl. .......................................... G08b 23/00
[58] Field of Search ........... 340/213 R, 271, 267 R, 340/262, 263; 192/12 R, 30 W; 73/9, 118, 136 R; 324/181

[56] References Cited
UNITED STATES PATENTS

| | | | |
|---|---|---|---|
| 3,052,117 | 9/1962 | Miller et al. | 73/136 R |
| 3,293,548 | 12/1966 | Hunt | 340/271 |
| 3,399,590 | 9/1968 | Johnson et al. | 340/271 |
| 3,505,863 | 4/1970 | Lucia | 73/136 R |
| 3,739,367 | 6/1973 | Fathauer | 340/267 R |

*Primary Examiner*—John W. Caldwell
*Assistant Examiner*—Richard P. Lange
*Attorney, Agent, or Firm*—Edwin W. Uren; Edward G. Fiorito; Paul W. Fish

[57] ABSTRACT

In order to automatically test electrically actuated clutches an apparatus has been developed which includes: a motor for driving the clutch; hystersis brakes and flywheel for providing a load to the clutch; and an optical encoder for measuring the rate of rotation of the load portion of the clutch. The tester also includes electronic circuitry for controlling the clutch actuating voltage and measuring the response of the clutch, this circuitry having: an encoder pulse generator for producing a status signal in response to the signals from the optical encoder; timing circuitry; a clutch voltage controller; and an indicator lamp control circuit for indicating the results of the tests on the clutch.

8 Claims, 7 Drawing Figures

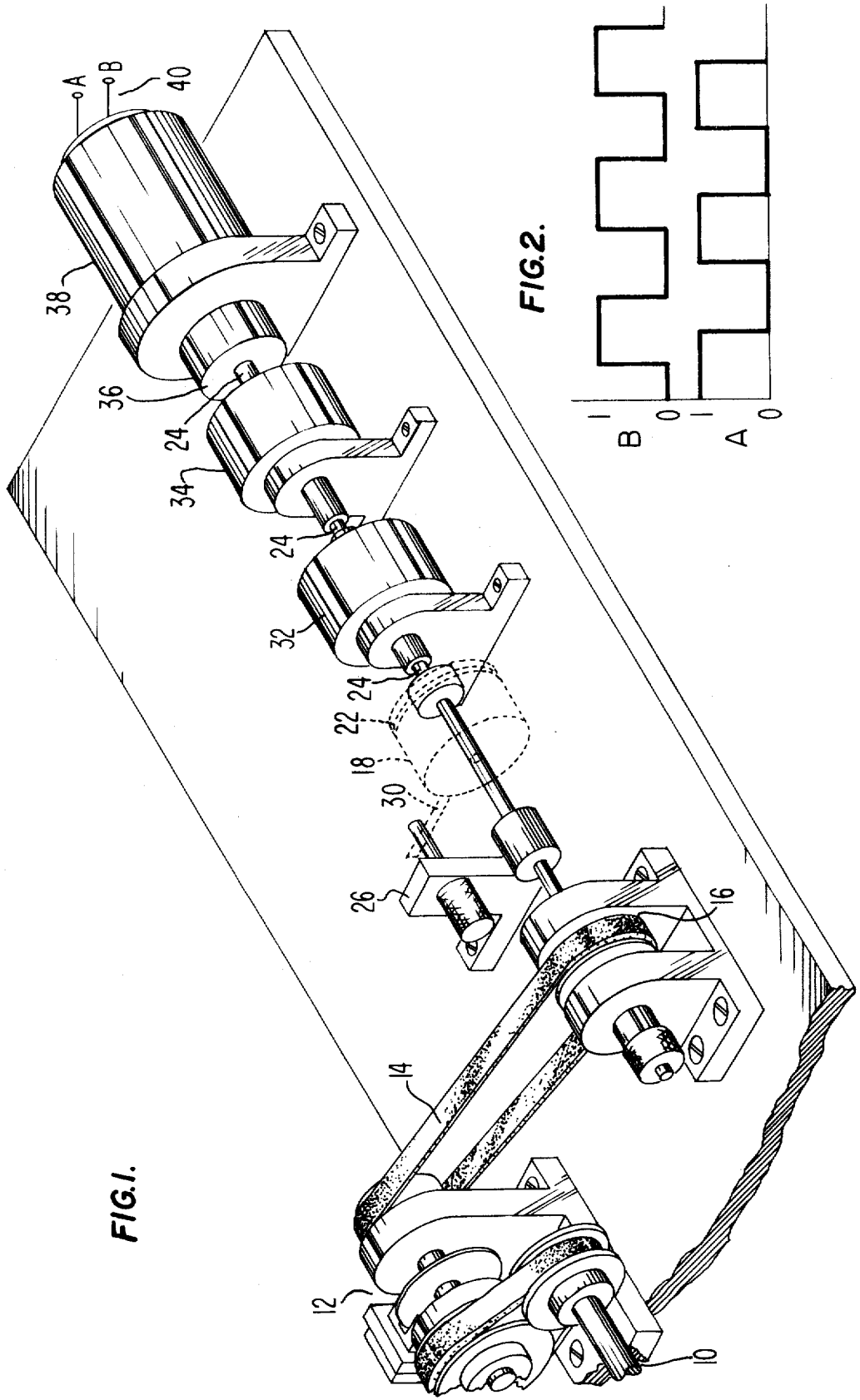

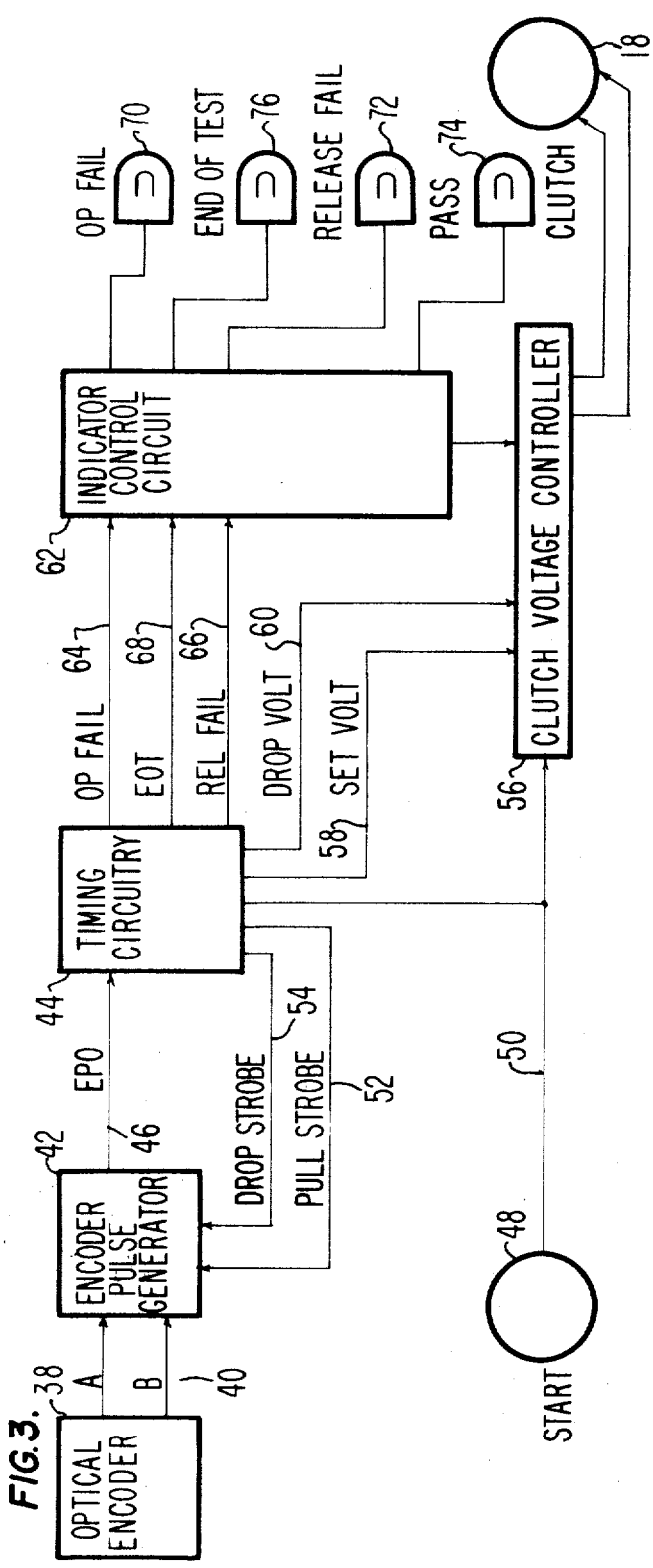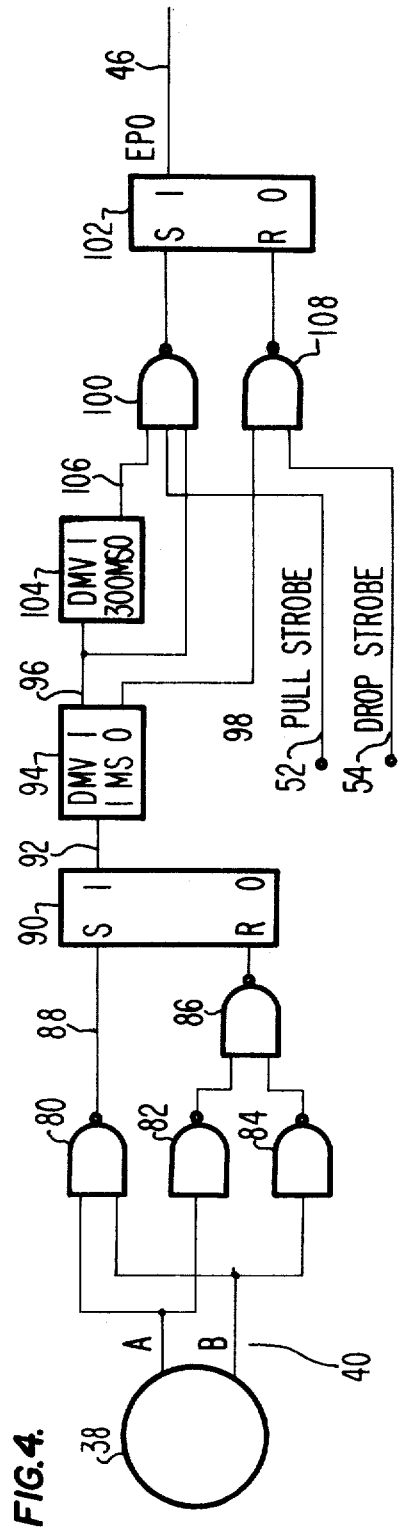

APPARATUS FOR TESTING ELECTRICALLY ACTUATED CLUTCHES

BACKGROUND OF THE INVENTION

This invention relates to the field of integrated test apparatus for electro-mechanical devices.

In testing clutches for use in electro-mechanical apparatus of various types there are two primary operational characteristics that are of sufficient importance to warrant testing. The first of these characteristics is the "pick-up time," which is the amount of time after the clutch has been energized that it takes the load portion of the clutch to reach a predetermined speed. This test is usually performed with the minimum actuating voltage likely to be applied to the clutch in the actual end product in which it will be used.

The second test is a measure of the "release time" or the time which is required for the load portion of the clutch to stop rotating after the actuating voltage to the clutch has been cut off. For the most practical test of the release time, the maximum likely actuating voltage, to which the clutch in the final product will be subjected, should be applied to the clutch for a significant amount of time before the voltage is cut off.

Prior to the development of this test apparatus it was necessary to test each of these responses separately often using an oscilloscope or some other means that required operator interpretation. Since the actual testing of each one of the clutches in a production environment using the prior art methods was time consuming and expensive, usually only the pick-up time of the clutch was tested. However, due to the fact that operating characteristics of various electro-mechanical products such as accounting machines, mini-computers and the like involve increasingly faster and more accurate response, the need for assuring the operation of the electro-mechanical components within design tolerances has become of significant economic importance.

SUMMARY OF THE INVENTION

It is accordingly an object of the invention to provide a means of automatically testing the pick-up and release time of a clutch without operator intervention.

It is an additional object of the invention to provide an electronic circuit to control the voltage applied to the clutch, measure the response of the clutch and to control indicating lamps during testing.

The test apparatus includes both a mechanical portion and an electronic portion. The mechanical portion of the test apparatus includes a motor for driving the clutch at a predetermined speed and a transmission means for transmitting the rotation of the motor to the clutch. The mechanical portion also includes a fixture for securing the clutch and hystersis brakes in combination with a flywheel for applying a load to the clutch. In addition there is an optical encoder attached to the load end of the clutch for measuring the rate of rotation of the load portion of the clutch.

The second portion of the test apparatus is composed of an electronic circuit for monitoring the speed of the load portion of the clutch; controlling the application of voltage to the clutch; and indicating whether the clutch has passed or failed the test. The circuit includes an encoder pulse generator which receives the output of the optical encoder. The encoder pulse generator provides a signal indicative of whether the clutch has reached a predetermined speed during the pick-up portion of the test or whether the load portion of the clutch has decreased below a predetermined speed during the release portion of the test.

Included also is a timing circuit that is responsive to the encoder pulse generator. This circuit has a number of functions including timing the various portions of the test and providing signal to the encoder pulse generator to direct the encoder pulse generator to produce a signal for use in either the pick-up or release portion of the test.

There is also a clutch voltage controller circuit that has as its functions: the actuation of the clutch during the pick-up portion of the test; the application to the clutch of a maximum voltage just before the release portion of the test is performed; and then the removal of the voltage from the clutch during release portion of the test.

An additional portion of the test circuitry consists of an indicator control circuit also responsive to signals from the timing circuit. This portion of the test circuitry will cause an "operate fail lamp" to light if the clutch does not pick up the predetermined speed in the specified time during the pick-up portion of the test. Similarly the indicator circuit will light the "release fail lamp" if the clutch does not release within the specified time during the release portion of the test. This circuit also controls an "end of test lamp" and a "pass lamp."

The operation of the test apparatus begins with the insertion of a clutch in the test fixture. The drive portion of the clutch is connected to the drive motor by means of the transmission so that the drive portion of the clutch will be driven at a constant speed. The load portion of the clutch is connected to the hystersis brakes and flywheel which will provide a known load to the clutch.

When the test begins the timing circuit transmits a signal to the clutch voltage controller that will cause the controller to apply the actuating voltage to the clutch. The actuating voltage will result in the drive portion of the clutch engaging with the load portion. If the speed of the load portion of the clutch does not reach the predetermined rate within the specified time, as measured by the timing circuit, an "operator fail" flip flop in the indicator control circuitry will be set, After the time for reaching the predetermined speed, during the pick-up portion of the test has elapsed, the timing circuit will cause the clutch voltage controller to apply the maximum actuating voltage to the clutch. This "maximum actuating voltage" represents the highest voltage that the clutch is likely to encounter in the actual end product.

When the clutch has been given sufficient time to react to the maximum voltage, the actuating voltage will be removed from the clutch. The timing circuit in combination with the encoder pulse generator will then determine if the clutch has stopped rotating within the specified time. If it has not a "release fail" flip flop in the indicator control circuit will be set.

At the termination of the test as determined by the timing circuit, an "end of time" signal will be sent to the indicator control circuit in order to activate the indicator control lamps. If the clutch has failed to pick up within the specified time, the operator fail lamp will light or if the release of the clutch has not occurred during the specified time, the release fail lamp will light. If, on the other hand, the clutch under test has passed both the tests, the pass lamp will light thereby indicating to the operator that the clutch has met its operational specifications.

BRIEF DESCRIPTION OF THE DRAWINGS

FIG. 1 is an illustration of the mechanical components of the clutch tester;

FIG. 2 is a timing diagram illustrating the signal output of the optical encoder;

FIG. 3 is a block diagram of the clutch testers circuitry;

FIG. 4 is a schematic diagram of the encoder pulse generator;

DETAILED DESCRIPTION OF THE INVENTION

Figure 5:
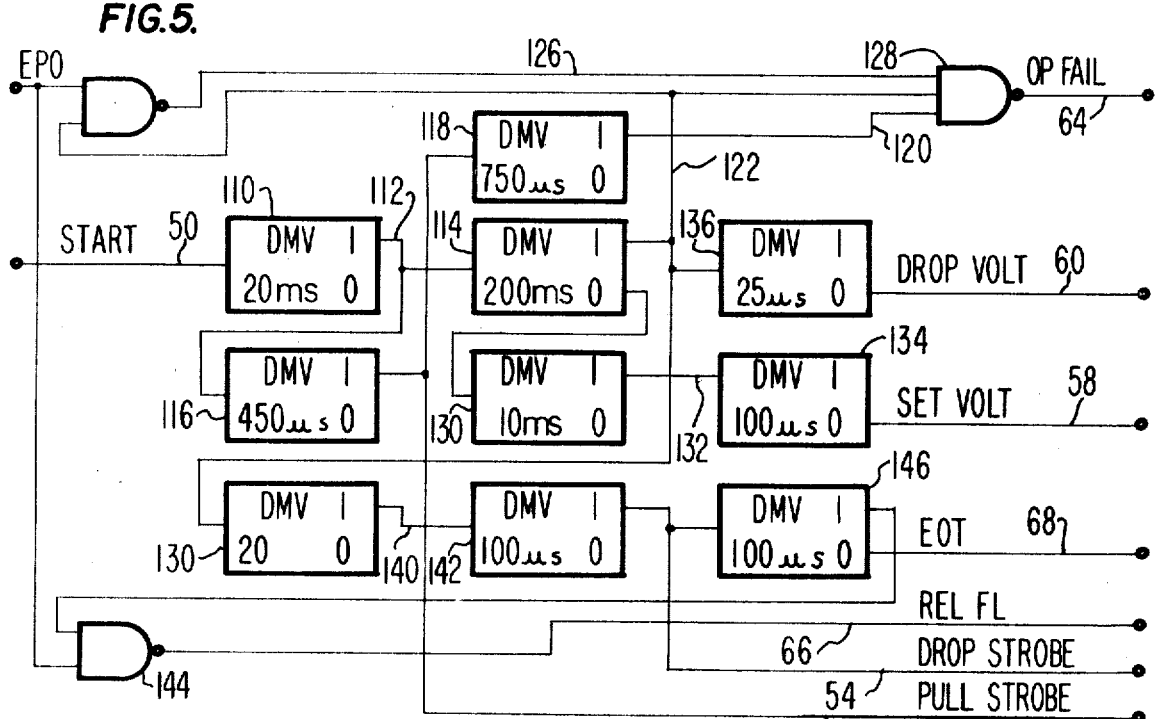
FIG. 5 is a schematic diagram of the timing circuit.

In order to test an electrically actuated clutch for "pick-up" and "release" time, it is necessary to provide a source of power to the drive portion of the clutch and at the same time provide load to the load portion of the clutch. In FIG. 1 of the drawing is illustrated the preferred embodiment of the test apparatus that provides both the driving force and the load to the clutch.

First, a motor (not shown) or some other source of rotational energy provides a constant speed source of power to the shaft 10. The rate of rotation of the shaft 10 is modified by the transmission 12 and the force transmitted by means of the belt 14 to the pulley 16. In the preferred embodiment the final speed of the drive pulley 16 can be adjusted to conform to that of the end product, in which the clutch will ultimately be used, by means of adjusting or changing the sizes of the pulleys in the transmission 12.

Power is then delivered to the clutch under test 18 by means of the drive shaft 20. The drive shaft 20 is secured to the drive portion of the clutch 18 so that the drive portion will rotate at the same speed as the drive shaft. Connected to the load portion of the clutch 22 is the load shaft 24. The load shaft 24 rotates independently of the drive shaft 20 so that the only time the load shaft 24 will rotate is when the load portion 22 of the clutch is rotating. In order to prevent the clutch as a whole and therefore the load portion 22 from rotating when the clutch is in a released state, the preferred embodiment of the invention includes a stop 26. The stop 26 is adjusted to abut an extension member 30 on the clutch 18 which is effective to keep the clutch as a whole from rotating.

Directly connected to the load shaft 24 are two hystersis brakes 32 and 34. These brakes provide a constant load torque that is representative of the torque that the clutch will have to overcome in the end product. In the preferred embodiment the hystersis brakes 32 and 34 are used as sources of load torque since the amount of load may be easily adjusted by changing the voltage input to the brakes. It should be noted at this point that the number of hystersis brakes used may vary depending upon the amount of load required and the specifications of the brakes themselves. In addition to the brakes 32 and 34 a flywheel 36 also forms a part of the load on the shaft 24. This flywheel is selected on the basis of the inertia that the clutch will have to overcome when picking up to speed in the final product and the inertia of the rotating parts of the final product when the clutch is released. The flywheel 36 should have a moment of inertia such that when combined with the moment of inertia of the rest of the load portion of the apparatus e.g. load shaft 24, it will approximate the moment of inertia of the end product. In summary, with respect to the hystersis brakes 32 and 34 and the flywheel 36, these elements of the test apparatus are selected to most closely simulate the load environment of the clutch in the end product.

Also connected to the load shaft 24 of the apparatus illustrated in FIG. 1 is an optical incremental encoder 38. The function of the encoder 38 is to generate a signal that is proportional to the rate of rotation of the shaft 24. In the preferred embodiment of the invention the optical incremental encoder functions in a manner similar to the Baldwin 5V75 produced by the Baldwin Electronics Company of Little Rock Arkansas. The signal produced on the output lines 40 of FIG. 1 by the optical encoder 38 are illustrated in FIG. 2. These binary square wave signals produce one pulse A of FIG. 2 for each degree of rotation of the shaft 24. The other signal B as illustrated in FIG. 2 is also generated for each degree of rotation of the shaft 24 but is delayed by one quarter of a cycle time. The frequency of the signals A and B of FIG. 2 will be proportional to the speed of rotation of the load shaft 24.

In FIG. 3, illustrated in block diagram form, is the electronic circuit for controlling the apparatus of FIG. 1. The electronic system shown in FIG. 2 responds to the signal generated by the optical encoder 38 as received over the lines 40. The signals generated by the optical encoder 38 are used as input to the first module the encoder pulse generator 42. The output of the encoder pulse generator 42, the "EPO" signal is transmitted to the timing circuit 44 over the line 46. The "EPO" signal on line 46 is an indication as to whether or not the speed of rotation of the load portion of the clutch is above or below a predetermined value. The encoder pulse generator interprets the A and the B signals from the optical encoder and, for example, when during the pick-up portion of the test the rate of the load portion of the clutch 22 reaches a predetermined value, the EPO signal will go from low to high. By the same token, during the release portion of the test the EPO signal will change to low when the rate of rotation of the load portion of the clutch 22 drops below a predetermined rate.

The second module the timing circuit 44 responds to the start test signal 48 received over line 50 by producing a "pull strobe" signal on line 52. This signal will cause the encoder pulse generator to produce a high EPO signal on line 46 when the load portion of the clutch reaches a predetermined rate of rotation. Similarly the timing circuit 44 will generate a signal on the drop strobe line 52 for conditioning the encoder pulse generator so that during the release portion of the test the EPO signal will go low when the speed of the clutch falls below a predetermined value.

The third module of the test circuit as illustrated in FIG. 2 is the clutch voltage controller 56 which controls the level of actuating voltage applied to the clutch 18. The clutch voltage controller 56 is also responsive to the timing circuit 44 and the start signal 48. In response to the start signal 48 the clutch voltage controller will initially apply the minimum voltage to the clutch 18 for the pick-up portion of the test. After the pick-up portion of the test has been performed as determined by the timing circuit 44, a "set volt" signal will be transmitted on line 58 from the timing circuit 44 to the clutch voltage controller 56. This signal will cause the clutch voltage controller to apply the maximum voltage to the clutch in preparation for the release portion of the test. After the maximum voltage has been given sufficient time to take full effect on the clutch the timing circuit will cause the clutch voltage controller, by means of a signal on line 60, to remove the actuating voltage altogether from the clutch. It is at this point that the release portion of the test is started.

The fourth module of the test circuit is the indicator control circuit 62 which receives its input from the timing circuit 44. If, for example, the clutch has not come up to speed during the pick-up portion of the test, the timing circuit, over line 64, will cause an op-fail flip flop in the indicator control circuit to set. By the same token, if the load portion of the clutch fails the release portion of the test, the timing circuit, over line 66, will cause the indicator control circuit to set a release-fail flip flop. When the time for the test has elapsed, as determined by the timing circuit 44, a signal will be generated on line 58 indicating the end of test resulting in the indicator control circuit 62 lighting the appropriate lamps. If the op-fail flip flop has been set, the op-fail lamp 70 will be lit as will the release-fail lamp 72 if the release fail flip flop has been set. On the other hand, if the clutch has passed both parts of the test successfully the pass lamp 74 will light along with the end of test lamp 76.

The logic elements of the circuit modules, shown in block form in FIG. 2, will be described in detail as follows. First in FIG. 3 is illustrated the preferred embodiment of the logic circuitry for the encoder pulse generator 42 of FIG. 2. The encoder pulse generator as of FIG. 3 receives over line 40 the A and B portions of the signals shown in FIG. 2. These signals are input to the NAND gates 82, 80 and 84. The output of NAND gates 82 and 84 are used as input to the NAND gate 86. The effect of these gates on the signals A and B will be to cause a low signal on line 88 only when the A and B signal are both high. In a similar manner the only time a low signal will appear on the line 90 is when both the A and B signal are high. Therefore the effect of having both A and B high at the same time will be to set the flip flop 92. Therefore the net result of filtering the A and B signals through the NAND gates 80, 82, 84 and 86 will be to set and reset the flip flop 90 for each degree of rotation of the load portion 22 of the clutch.

Each time the flip flop 90 is reset, the negative going voltage on line 92 will trigger the delay multivibrator 94. When th delay multivibrator 94 has been triggered by the negative going voltage on line 92 it will produce a high signal on line 96 having a duration of one millisecond. For purposes of illustration, the delay time of the delay multivibrators used in the preferred embodiment of the invention have been included in the drawing. It will be understood, however, that these values for the delay multivibrators as well as the other circuit elements are a function of the characteristics of the particular clutch and the environment for which the clutch is being tested. Since the delay multivibrator 94 is triggered by the resetting of the flip flop 90, the signal on line 96 will be high continuously when the speed of the rotation of the clutch 38 is sufficient to cause the flip flop 90 to set and reset every one millisecond or less. Therefor when the clutch reaches the minimum pick up speed, line 96 will have a steady high signal thereon and similarly the signal on line 98 will be continuously low.

During the pick-up portion of the test the pull strobe line 52 will have a high signal placed on it thus enabling the NAND gate 100. The effect of enabling the NAND gate 100 will be to cause the flip flop 102 to set when the speed of the rotation of the clutch 38 has reaches a sufficient velocity to cause the delay multivibrator 94 to produce a continuous high signal on line 96. The purpose of the delay multivibrator 104 attached to line 96 is to provide a low signal on line 106 of at least 300 micro-seconds when the speed of rotation of the clutch 38 is slightly below the minimum pick up speed so that a low signal off the NAND gate 100 will be blocked long enough to prevent the flip flop 102 from being set. The overall function of the circuitry shown in FIG. 4 is to produce a high signal on the EPO line 46 when the clutch 38 has reached or exceeded the minimum test speed during the pick-up portion of the test.

The encoder pulse generator circuit in FIG. 4 operates in a similar manner during the release portion of the clutch test. During the release portion of the test, the drop strobe line 54 will be energized with a high signal. This will cause the NAND gate 108 to respond to the zero side of the delay multivibrator 94. When the clutch is not rotating or rotating very slowly, there will be constant high signal on line 98 which will have the effect of causing the NAND gate 108 to reset the flip flop 102. Therefore when the clutch 38 is stopped during the release portion of the test, the flip flop 102 will be reset and a low signal will be produced on the EPO line 46.

In summary with respect to the encoder pulse generator as illustrated in FIG. 4 it can be seen from the above discussion that the signal on the EPO line will give an indication of whether the clutch 38 has reached the predetermined minimum speed during the pick-up portion of the test, as evidenced by a high signal, and at the same time will give an indication as to whether the clutch 38 has stopped during the release portion of the test by producing a low signal on the EPO line 46.

In the detailed description of the preferred embodiment of the timing circuit 44 as set forth in FIG. 5, specific parameters are included for the delay multivibrators. However, it should be understood that these values, again are a function of the particular clutch under test and the ultimate environment in which that clutch will function. These values are for illustration purposes only. The overall function of the timing circuit as shown in FIG. 5 is to provide signals for activating the other components of the test apparatus. At the beginning of the test, when a start signal has been received over line 50, the first delay multivibrator 110 will produce a 20 millisecond pulse on line 112. At this point in time the minimum activating voltage will be applied to the clutch 18 and the 20 millisecond delay provided by the delay multivibrator 110 will give the clutch sufficient time to engage.

After 20 millisecond the signal on line 112 will go low thus triggering the delay multivibrators 114 and 116. The delay multivbrator 116 will then produce a high signal on the line 52 for a period of approximately 450 microseconds which will, as discussed above, activate the NAND gate 100 of the encoder generator as shown in FIG. 4. If the clutch 18 is rotating at minimum speed or above the flip flop 102 will be set causing a high signal to be placed on the EPO line 46.

After the 450 microseconds has elapsed, the signal on line 52 will go low thereby triggering the delay multivibrator 118 and producing a high signal on the line 120 for 750 microseconds. During this same interval the delay multivibrator 114 will produce for 200 milliseconds a high signal on the line 122. As a result during the pick-up portion of the test, lines 120 and 122 will have a high voltage applied to them. At this point in the pick-up portion of the test, if the clutch has reached minimum speed, the EPO line 46 will have a high signal thereon, which will combine with the high signal on line 122 to open the NAND gate 124. Therefor if the clutch has reached minimum speed there will be a low signal on line 126. This low signal on line 126 will effectively block the NAND gate 128 from producing a low signal on line 64. However, if the clutch 18 has not reached the minimum speed during the pick-up portion of the test, a low signal on the EPO line 46 will result in the gate 124 producing a high signal on line 126. This will cause the NAND gate 128 to produce a low signal on line 64 indicating that the clutch has failed to come up to speed within the allotted time.

After the pick-up portion of the test has been completed, as measured by the delay multivibrator 118, the release portion of the test will automatically commence. First the delay multivibrator 130 will respond to the zero side output of the delay multivibrator 114 and produce a pulse on line 132 having a duration of 10 milliseconds. At the completion of this 10 milliseconds, the delay multivibrator 134 will produce a pulse on the set voltage line 58 of approximately 100 microseconds. Again the set voltage is the highest voltage that is likely to be applied to the clutch in the end product. When this delay of 200 milliseconds, as measured by the delay multivibrator 114, is over the signal on the line 122 in going to zero will cause the delay multivibrator 136 to produce a 25 microsecond pulse on the drop volt line 60. The function of the drop volt line is to cause the actuating voltage to be removed from the clutch. The signal on line 122 in going to zero also will cause the delay multivibrator 138 to produce a 20 millisecond pulse on line 140. After this 20 millisecond delay, the delay multivibrator 142 will produce a 100 microsecond pulse on line 54.

The high signal on the drop strobe line 54 will then cause the encoder pulse generator of FIG. 4 to produce a signal on the EPO line 46 as previously described. In other words, when there is a high signal on the drop strobe line 54 and if the clutch 18 has essentially stopped rotating there will be a low signal on the EPO line 46. However, if the clutch has not stopped rotating, there will be a high signal on the EPO line 46 which is also used as input to the NAND gate 144. The delay multivibrator 146 will respond to the signal on the delay multivibrator 142 and produce a high signal on the line 146 after the 100 microsecond delay. If the clutch 18 has not stopped rotating, the combination of the high signal on line 46 and the high signal on line 146 will cause the NAND gate 144 to produce a low signal on the release fail line 66. In addition when the delay multivibrator 146 has a high output on line 148, as previously described, it will have a low output on the EOT line 68 thereby signaling the end of the test.

Figure 6:
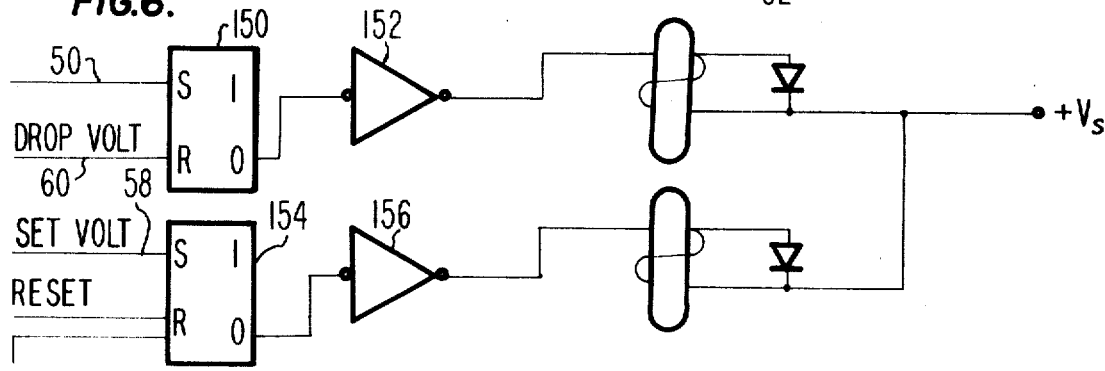
FIG. 6 is a schematic diagram of the clutch voltage controller.

In FIG. 6 is illustrated the logic of the clutch voltage controller 56 of FIG. 3. The clutch voltage controller first responds to the start signal on line 50 as it is input to the flip flop 150. When the flip flop 150 is set, the amplifier 152 will be switched on thus applying the minimum voltage to the clutch 18. When the set voltage signal is received on line 58 from the timing circuit, the flip flop 154 will be set thereby causing additional voltage through amplifier 156 to be applied to the clutch. This additional voltage will correspond to the maximum anticipated voltage that the clutch will be subjected to in the end product. As indicated previously, during the release portion of the test a low signal will be produced on the drop volt line 60 which will cause the flip flop 150 to be reset thereby removing all of the voltage from the clutch.

Figure 7:
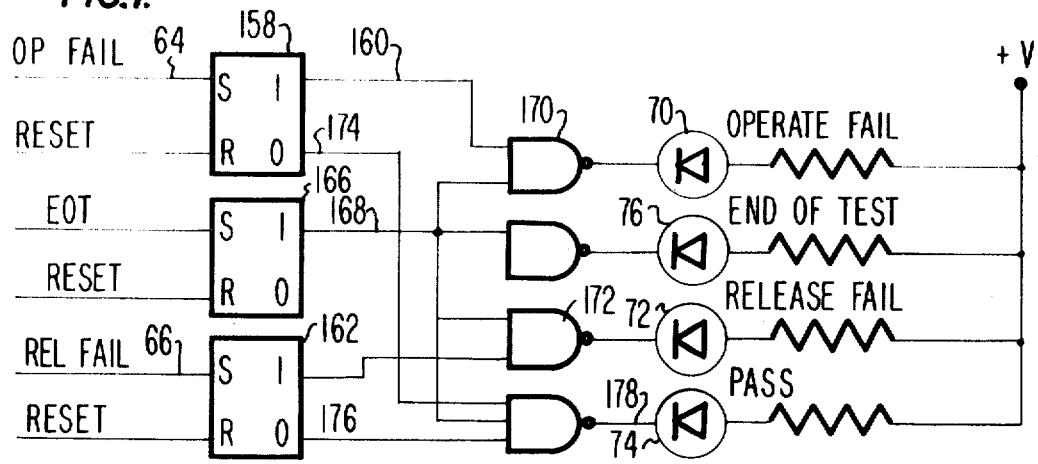
FIG. 7 is a schematic diagram of the lamp control circuit.

The final portion of the circuitry, that is identified by block 62 in FIG. 3, is the indicator control circuit. This circuit is illustrated in schematic form in FIG. 7. If during the pick-up portion of the test the clutch fails to reach the predetermined minimum speed, the timing circuit 44 will produce a low signal on the op-fail line 64. This will cause the op-fail flip flop 158 to set and produce a high signal on line 160. In a similar fashion, if the clutch fails to release during the release portion of the test, a low signal will be generated on the release fail line 66 thereby causing the release fail flip flop 162 to set thus generating a high signal on line 164. When the test has been completed the timing circuit 44 will produce a low signal on the end of time line 68 thus resetting the EOT flip flop 166 and producing a high signal on the line 168.

At the termination of the test, when a high signal is present on line 168, if the op-fail flip flop 158 has been set, the NAND gate 170 will open and cause the operate fail lamp to light. Similarly, if the release fail flip flop 162 is set, the NAND gate 172 will cause the release fail lamp 172 to light. However, in the event the clutch has passed both of the tests, i.e. neither the op-fail flip flop 158 nor the release fail flip flop 162 has been set, there will be a high signal on lines 174 and 176 which when combined with the EOT signal on 168 will cause the NAND gate 178 to open thereby causing the pass lamp 74 to become illuminated.

It should be apparent that the test circuit as set out in block diagram form in FIG. 3 and explained in detail in FIGS. 4, 5, 6 and 7 will completely control the pick up and release test of the clutch 18 without the need for any operator intervention. In addition, the results of the test will, in the preferred embodiment, indicate the results of that test to an operator by means of indicator lamps 72, 74 and 76. Along with being apprised as to whether the clutch has met specification, the operator will have an indication of which portion of the test it has failed, i.e. the pick-up or release portion.

What is claimed is:

1. An apparatus for testing the pick up and release times of clutches comprising:

drive means for rotating the drive portion of the clutch;

load means for placing a load on the load portion of the clutch;

encoding means for generating electronic pulses proportional to the speed of the load portion of the clutch;

encoder pulse generator means responsive to said encoder means for generating a signal indicating the speed of rotation of the load portion of the clutch;

timing means responsive to said encoder pulse generator means for sequencing the steps within the test apparatus;

voltage control means responsive to said timing means for controlling the application of power to the clutch; and indicator means responsive to said timing means for providing indications of the results of the tests on the clutch.

2. The apparatus of claim 1 wherein said drive means comprises:

a constant speed motor;

transmission means for modifying the output of said motor; and a transmission member secured to at one end of said transmission means and at the other end to the drive portion of the clutch, for transmitting rotational energy from said transmission means to the drive portion of the clutch.

3. The apparatus of claim 1 wherein said load means includes:

at least one hystersis brake secured to the load portion of the clutch; and at least one flywheel rotatably attached to the load portion of the clutch.

4. The apparatus of claim 1 wherein said encoding means is an optical incremental encoder that will generate a first signal for a predetermined increment of rotation of the load portion of the clutch and a second signal equivalent to said first signal delayed by a predetermined increment of time.

5. The apparatus of claim 1 wherein said encoder pulse generator means includes:

a first flip flop responsive to said pulses from said encoding means that changes state at a rate proportional to the rate of rotation of the load portion of the clutch;

a first delay element responsive to said first flip flop means for producing a signal of single polarity when the speed of rotation of the load portion of the clutch is below a predetermined rate; and a second flip flop resonsive to said first delay means for producing a signal representative of the status of rotation of the load portion of the clutch.

6. The apparatus of claim 1 wherein said timing means includes:

a plurality of signal delay elements;

a first gating element responsive to said delay elements, a start signal, and said signal from said encoder pulse generator means, for generating a signal indicating the clutch failed to pick up; and a second gating element responsive to said plurality of delay elements and said signal from said encoder pulse generator for generating a signal indicating the clutch failed to release.

7. The apparatus of claim 1 wherein said indicator means includes:

a first flip flop responsive to a signal from said timing means indicating the clutch failed to pick up within the predetermined time;

a second flip flop responsive to a signal from said timing means indicating the clutch failed to release within a predetermined time;

a third flip flop for receiving an end of time signal from said timing means;

a first gate element responsive to said first flip flop and said second flip flop;

a second gate element responsive to said second flip flop and said third flip flop;

a third gate element responsive to said first flip flop, said second flip flop, and said third flip flop;

an operate fail lamp responsive to said first gate element;

a release fail lamp responsive to said second gate element; and a pass lamp responsive to said third gate element.

8. The apparatus of claim 1 wherein said indicator means includes indicator lamps for indicating the results of the tests.

* * * * *